April 5, 1932.  L. O. BEARD  1,852,690

REAMER

Filed Feb. 14, 1930

Inventor

Lawrence O. Beard

By Percy H. Moore.

Attorney

Patented Apr. 5, 1932

1,852,690

UNITED STATES PATENT OFFICE

LAWRENCE O. BEARD, OF LANCASTER, PENNSYLVANIA

REAMER

Application filed February 14, 1930. Serial No. 428,477.

My invention relates to expansion reamers for general use in hand or machine reaming operations.

The principal object of the invention is to provide a reamer which will produce perfectly round and straight holes.

Another object of the invention is to provide right and left hand angled cutting blades one in advance of the other so that the second or following blades will remove all marks or rough parts left by the first or primary cutters.

Another object of the invention is to provide pilot members integrally formed with the reamer shank adjacent the respective cutting blades to insure substantially simultaneous and uniform expansion of these members.

Another object of the invention is to position the pilots sufficiently close to the front and rear ends of the respective cutting blades to permit of accurate piloting in the reaming of comparatively short bearings, such as connecting rod bearings.

Other and more specific objects and advantages of the invention will be apparent as the specification is considered in connection with the accompanying drawings, in which.

Figure 1:
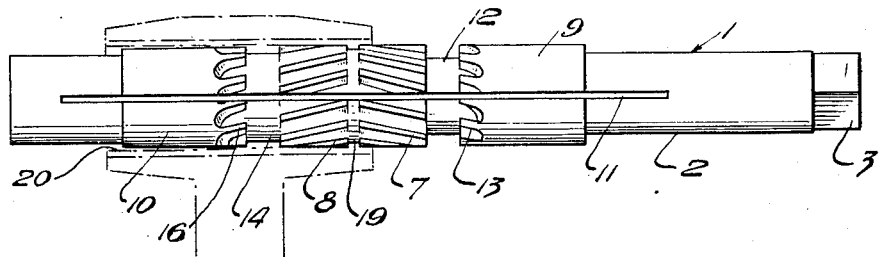
Figure 1 is a side elevation of a reaming cutter embodying the invention, and shows in outline a connecting rod bearing to which the reamer is applied, the reamer being shown as it appears at the beginning of the reaming operation.
Figure 3:
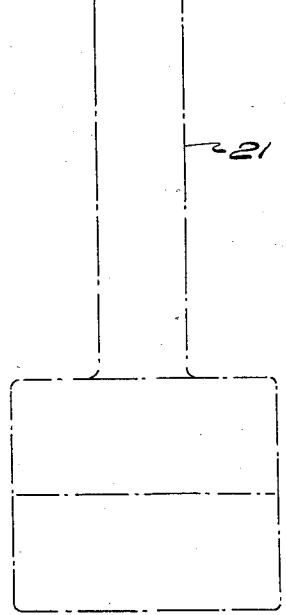
Figure 3 is a section on the line 3—3 of Figure 2.
Figure 2:
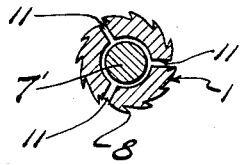
Figure 2 is a longitudinal section of the reamer showing the means for expanding the cutting blades and pilots.
Figure 2:
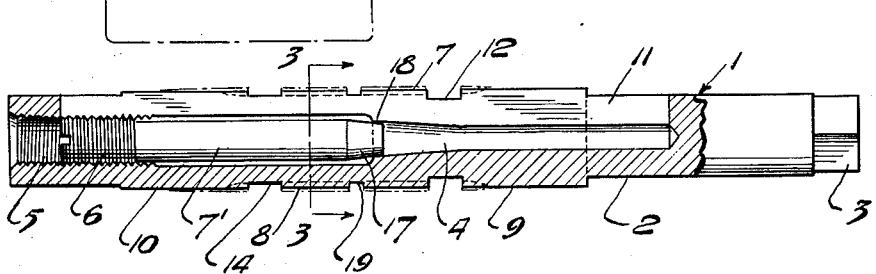

Referring more particularly to the drawings wherein the same reference numerals indicate like parts in all the figures, 1 represents the reamer having the hollow shank 2, the free end of which is squared as at 3 to facilitate attachment of a wrench or other operating tool. The outer open end of the bore 4, of the shank 2 is internally threaded as at 5 for the purpose of receiving the threaded portion 6 of an expander 7', the purpose of which will be explained hereinafter.

Right and left hand angled cutting blades 7 and 8 respectively are integrally formed on the reamer shank approximately intermediate the ends thereof. Adjacent the outer ends of the respective groups of cutters are pilots 9 and 10, also integrally formed on the reamer shank, and in order to impart flexibility to the blades and to the pilots, that is permit expansion and contraction of these parts, by means of the expander 7', elongated slots 11 are cut or otherwise formed therein. These slots extend through and for a substantial distance beyond each end of that portion of the shank upon which the cutting blades are formed and are all preferably parallel to the axis of the reamer.

When the cutting faces of the blades 7 and 8 of the reamer 1 wear down, or when it is desired to increase their cutting capacity, expander 7' is screwed home in the bore 4 until the beveled end 17 of the member 7' engages the shoulder 18, thus causing the flexible or expansible blades and pilots to expand practically simultaneously and uniformly.

The opposing angularity of blades and their parallel expansive action results in a better bearing hole being reamed. The first set of blades reams or trues the hole while the second set removes the marks or rough places left by the first set, thus producing a perfectly smooth straight bearing surface. It will also be noted that by locating the pilots adjacent the cutting blades that the reaming of very short holes, such as connecting rod bearings or the like, can be effectively accomplished.

The pilot 9 is separated from the rearwardmost blades 7 by a groove 12, and at its forward edge is formed with short cutting blades 13, which align with and are in effect continuations of the blades 7. It will also be noted that a groove 14 similar to the groove 12, but of slightly less depth, separates the forward pilot 10 from the foremost or leading blades 8, in alinement with short continuations 16 formed in the rear edge of the pilot 10. Each blade 7 and its corresponding blade 8 terminates in and is separated at its forward and rear end respectively by a broken circular groove 19. As the bore 4 of the reamer is larger at its forward end than at its rear end, it is desirable to have the groove 12 slightly deeper than the groove 14 in order to get parallel expansion of the blades.

In practice the reamer 1, is inserted in the bore 20 of the connecting rod 21, or other part to be reamed. The reaming can be effected by means of a wrench or other tool applied to the end 3 of the reamer or the latter may be connected to a suitable machine. During the first part of the reaming operation the pilot 10 guides and steadies the cutting blades in the bore 20, and as the pilot 10 leaves the bore the pilot 9 enters and functions during the remainder of the operation.

Having thus described my invention what I claim is:

A reamer comprising a differentially bored shank, expansible cutting blades on said shank, expansible pilots integrally formed on said shank adjacent said blades, said shank having circular grooves separating the blades from the pilots, one of said grooves being deeper than the other to compensate for the variation in size of the bore, and means for expanding the blades and pilots.

In testimony whereof I affix my signature.

LAWRENCE O. BEARD.